(12) United States Patent
Birch et al.

(10) Patent No.: US 8,275,165 B2
(45) Date of Patent: Sep. 25, 2012

(54) COMMUNICATION DEVICE WITH COMBINED ELECTRICAL SOCKET AND MICROPHONE OPENING

(75) Inventors: Ole Birch, Naerum (DK); Anthony Nesbitt, Jarrow (GB)

(73) Assignee: GN Netcom A/S (DK)

( * ) Notice: Subject to any disclaimer, the term of this patent is extended or adjusted under 35 U.S.C. 154(b) by 190 days.

(21) Appl. No.: 12/740,807

(22) PCT Filed: Oct. 30, 2008

(86) PCT No.: PCT/DK2008/000387
§ 371 (c)(1),
(2), (4) Date: Sep. 23, 2010

(87) PCT Pub. No.: WO2009/056143
PCT Pub. Date: May 7, 2009

(65) Prior Publication Data
US 2011/0019860 A1   Jan. 27, 2011

(30) Foreign Application Priority Data
Oct. 31, 2007   (DK) .................................. 2007 01553

(51) Int. Cl.
*H04R 25/00* (2006.01)
*H04M 1/00* (2006.01)

(52) U.S. Cl. ...................... 381/375; 381/381; 455/575.2; 455/575.6

(58) Field of Classification Search .................. 381/375, 381/381, 383, 384, 370, 371, 373, 374, 122, 381/376; 455/569.1, 569.2, 575.1, 575.2, 455/575.4, 575.6; 379/420; 439/527, 544, 439/533
See application file for complete search history.

(56) References Cited

U.S. PATENT DOCUMENTS

| 6,748,238 B1 * | 6/2004 | Lau .............................. 455/556.1 |
| 7,020,300 B1 | 3/2006 | Villaverde |
| 2002/0102947 A1 * | 8/2002 | Hofman ........................... 455/90 |
| 2002/0131585 A1 | 9/2002 | Jones et al. |
| 2002/0136422 A1 | 9/2002 | Renner |

(Continued)

FOREIGN PATENT DOCUMENTS
EP   1729494 A   12/2006
(Continued)

OTHER PUBLICATIONS
International Serach Report for PCT/DK2008/000387.

*Primary Examiner* — Hai Phan
(74) *Attorney, Agent, or Firm* — Altera Law Group, LLC

(57) ABSTRACT

A communication device comprises a housing with a housing wall encapsulating a housing interior. A microphone is arranged in the housing interior and communicates via an audio passage with the outside of the housing. An electrical socket is adapted to receive an electrical plug through a socket opening, which is accessible from the outside of the housing. The audio passage comprises the socket opening and the electrical socket includes a socket casing which surrounds the socket opening and extends in the insertion direction of the electrical plug. The socket casing includes through-going holes which form a part of the audio passage. The electrical plug is adapted to be removably inserted in the electrical socket and is provided with latching protrusions, which are adapted to be received in the through-going holes in the socket casing, when the electrical plug is inserted in the electrical socket.

3 Claims, 4 Drawing Sheets

U.S. PATENT DOCUMENTS

2004/0097127 A1* 5/2004 Smith et al. .................. 439/533
2007/0077965 A1* 4/2007 Fox ............................... 455/557
2008/0150479 A1* 6/2008 Cho et al. ..................... 320/113
2008/0166001 A1  7/2008 Hankey et al.

FOREIGN PATENT DOCUMENTS

| EP | 1768365 | 3/2007 |
| GB | 2345816 A | 7/2000 |
| WO | WO 2006/103269 | 10/2006 |
| WO | WO 2009/089136 | 7/2009 |

* cited by examiner

COMMUNICATION DEVICE WITH COMBINED ELECTRICAL SOCKET AND MICROPHONE OPENING

TECHNICAL FIELD

The invention relates to a communication device, e.g. a headset, comprising a housing with a housing wall encapsulating a housing interior, a microphone arranged in the housing interior and communicating via an audio passage with the outside of the housing, an electrical socket adapted to receive an electrical plug through a socket opening, which is accessible from the outside of the housing.

BACKGROUND ART

Headsets and other compact communication devices like the one according to the preamble of claim 1 are typically used in connection with telecommunication or audio listening. Modern headsets are small compact units with a small surface area leaving only a little space for arranging switches, buttons, electrical sockets, microphone openings etc. Thus, it can be a challenge to design a modern compact headset with an aesthetical appearance. Wireless headsets, such as DECT office headsets or Bluetooth headsets used with cell phones, need frequent recharging. They are therefore provided with a charging socket or external contacts. It is most usual that small Bluetooth headsets have a charging socket, into which an electrical plug connected to a charger, can be inserted. Headsets provided with external contacts are typically recharged by being placed in a charging cradle with corresponding charging contacts. Small Bluetooth headsets, such as JABRA JX10 are, due to space limitations, mostly provided with the charging socket in the end face that lies opposite the end with the microphone. Modern headsets can also be provided with electrical sockets for purposes other than charging, for example for receiving and sending data signals or even audio signals.

DISCLOSURE OF THE INVENTION

The object of the invention is to propose an improved way of arranging components in a communication device in order to obtain advantages regarding size and design.

The communication device according to the invention is characterised in that the audio passage comprises the socket opening. As the socket opening is utilized for leading sound from the surroundings to the microphone, which is arranged in the interior of the housing, there is no need for a separate opening in the housing wall for the microphone. Thus, essentially all or at least the main part of the sound reaching the microphone, travels via the socket opening. This means more freedom in designing the outer appearance of the communication device.

According to a preferred embodiment, communication device is formed by a headset. The invention is particularly useful when used with headsets, as these are getting smaller and smaller.

According to an embodiment, the housing comprises a first end face and a second end face, where the electrical socket is arranged in the first end face and the speaker opening is arranged closer to the second end face than the first end face.

According to a preferred embodiment, the headset comprises a cradle with a cradle bottom and a recess adapted to receive the headset housing and extending between an upper end and a recess bottom, the recess bottom lying closer to the cradle bottom than the upper end of the recess, where the recess bottom comprises an electrical plug adapted to the electrical socket, so that the electrical plug is inserted in the electrical socket when the headset housing is received by the recess. With such a solution the end of the headset body comprising the socket is pointing downwards when the headset is mounted on the head of a user and when it is placed in its cradle. This means that any information given on the outside of the headset housing, e.g. the brand of the headset, display information, etc., is oriented essentially in the same direction in both situations.

According to an embodiment, the socket comprises a socket casing, which surrounds the socket opening and which at least partly extends in the insertion direction of the electrical plug.

The socket casing may comprise one or more through-going holes, which form a part of the audio passage.

Preferably, the microphone is arranged in a microphone boot, which abuts the socket casing and has a sound opening, wherein the sound opening faces the socket casing, so that it communicates with the through-going holes in the socket casing. This is a simple way of arranging the microphone in relation to the socket.

According to an embodiment, the headset comprises an electrical plug, which is adapted to be removeably inserted in the electrical socket, and which is provided with one or more latching protrusions, which are adapted to be received in the through-going holes in the socket casing, when the electrical plug is inserted in the electrical socket. Thus, the through-going holes are utilized for two different purposes.

As an alternative, the headset comprises an electrical plug, which is adapted to be removeably inserted in the electrical socket, and which is provided with one or more recesses, and where the through-going holes in the socket casing partly surround locking tongues with protrusions, which are adapted to be received in the recesses in the electrical plug, when the latter is inserted in the electrical socket.

The headset may be a wireless headset and the electrical socket being adapted to be used for charging the headset.

The electrical socket is preferably a USB-receptacle, preferably a micro-USB receptacle.

According to the invention, the communication device may further comprise a sound tube device with a first end and a second end, where the sound tube device at the first end comprises a sound plug, which is adapted to be detachable inserted in the socket opening, and at the second end comprises a sound tube opening, and wherein the interior of the sound tube device forms a part of the audio passage. This sound tube device can be used for improving the signal to noise ratio by placing the sound tube opening closer to the mouth of the user than the socket opening.

The sound tube device may comprise a deformable sound tube, so that it can be manipulated to point in a desired direction.

BRIEF DESCRIPTION OF THE DRAWINGS

The invention is explained in detail below with reference to the drawing illustrating preferred embodiments of the invention and in which.

Figure 1:
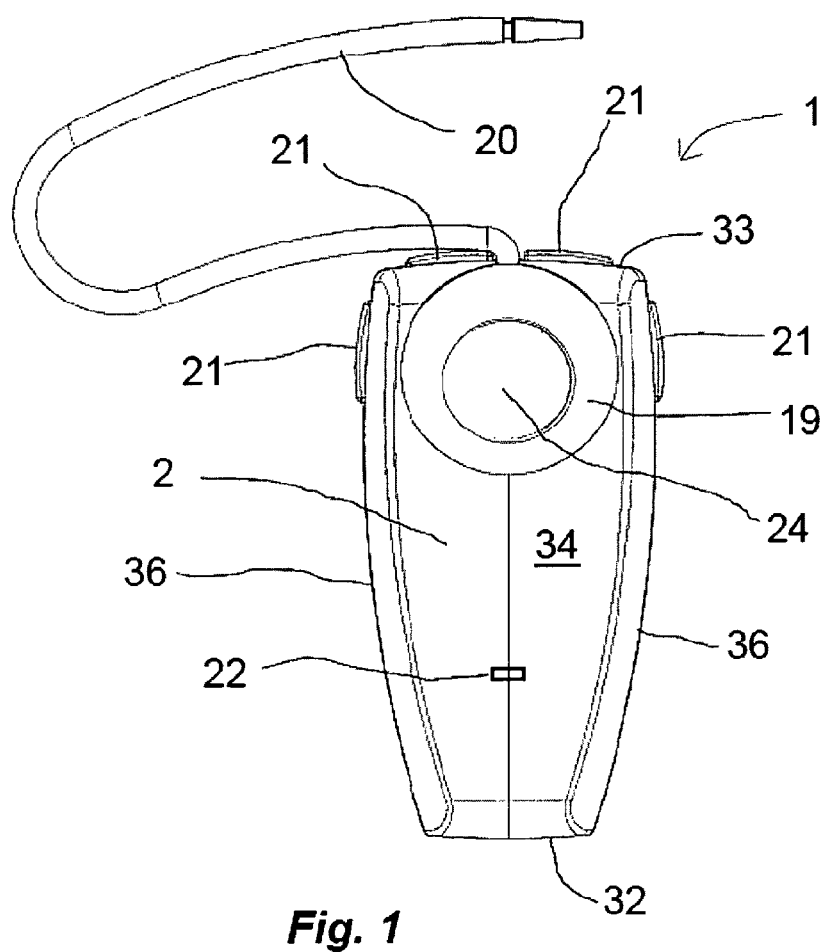
FIG. 1 is a rear view of a preferred embodiment of a headset according to the invention.

The following reference signs are used in the figures and the following detailed description of the preferred embodiment.

1 headset
2 headset housing
3 housing wall
4 housing interior
5 microphone
6 electrical socket
7 electrical plug
8 socket opening
9 audio passage
10 socket casing (shield)
11 microphone boot
12 sound opening
13 through-going hole
14 microphone wire
15 first wall of plug casing
16 printed circuit board
17 terminal base
18 contacts
19 earbud
20 earhook
21 button
22 LED (light emitting diode)
23 earbud stem
24 speaker opening
25 second wall of plug casing
26 plug housing
27 plug casing
28 latching member
29 slot
30 latching protrusion
31 insertion direction of electrical plug
32 first end face of headset housing
33 second end face of headset housing
34 first wall of headset housing
35 second wall of headset housing
36 sidewalls of headset housing
37 first wall of socket casing
38 second wall of socket casing
39 microphone receiving hole
40 connecting hole
41 front chamber
42 interior of electrical socket
43 cradle
44 cradle bottom
45 recess
46 upper end of recess
47 recess bottom
48 recess plug
49 sound tube device
50 sound tube
51 sound tube opening
52 sound plug

MODES FOR CARRYING OUT THE INVENTION

Figure 2:
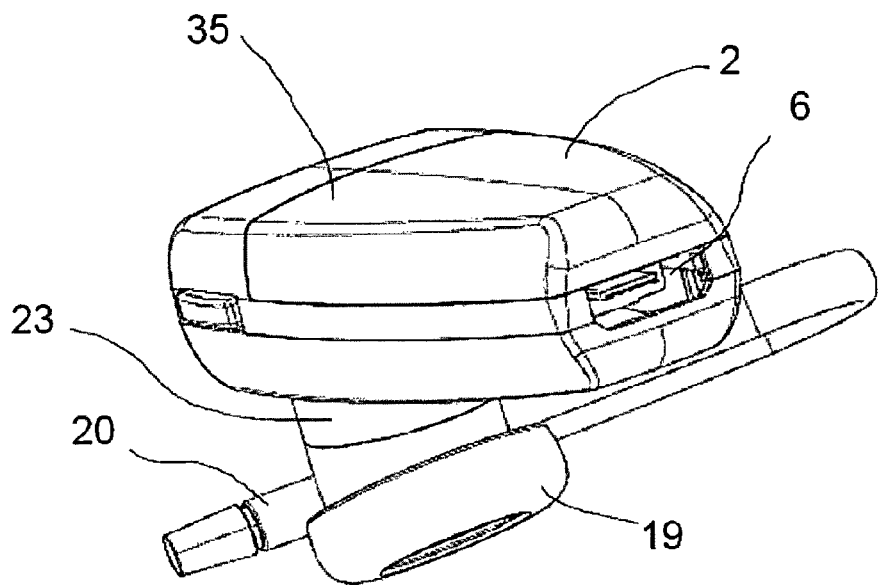
FIG. 2 is a perspective view of the headset of FIG. 1.

FIGS. 1 and 2 disclose a headset 1 according to a preferred embodiment of the invention. The headset is a wireless headset to be used with mobile phones. The headset 1 comprises a housing 2 with a first end face 32, a second end face 33, a first wall 34 facing the ear of the user during use and a second wall 35 facing away from the ear during use. Two sidewalls 36 connect the first wall 34 and the second wall 35. Close to the second end face 33, the first wall 34 comprises a protruding earbud stem 23 with an earbud 19 to be inserted into the concha of a user's ear. A speaker is arranged inside the earbud, and during use, sound emanates from a speaker opening 24 in the earbud. An earhook 20 is mounted to the earbud stem 23. During use, the earhook 20 is positioned behind the pinna of the ear and hereby the earbud 19 can be held against the auditory canal of the user's ear. Buttons 21 for operating the headset are arranged on the sidewalls 36 and the second end face 33. A LED (light emitting diode) is a part of the user interface and lightens up or flashes depending on the status of the headset (e.g. "incoming call", "standby mode", "low battery"). The first end face 32 of the housing 2 is provided with an electrical socket 6, which is described in more detail below.

Figure 3:
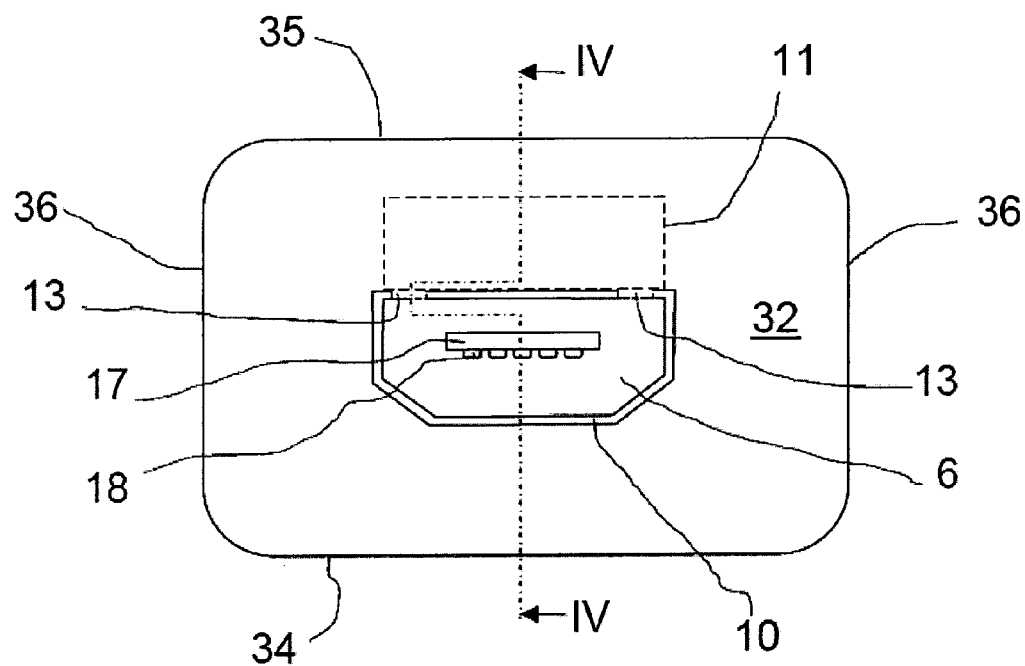
FIG. 3 is a schematic end view of a headset according to the preferred embodiment of the invention.

FIG. 3 discloses in a schematic form the second end face 32 of the housing 2. The socket 6 is a socket or receptacle according to the micro-USB standard. It comprises a socket casing 10 or shield of metal and a terminal base 17 with contacts 18. Indicated with dashed lines, a microphone boot 11 is arranged inside the housing next to the socket 6.

Figure 4:
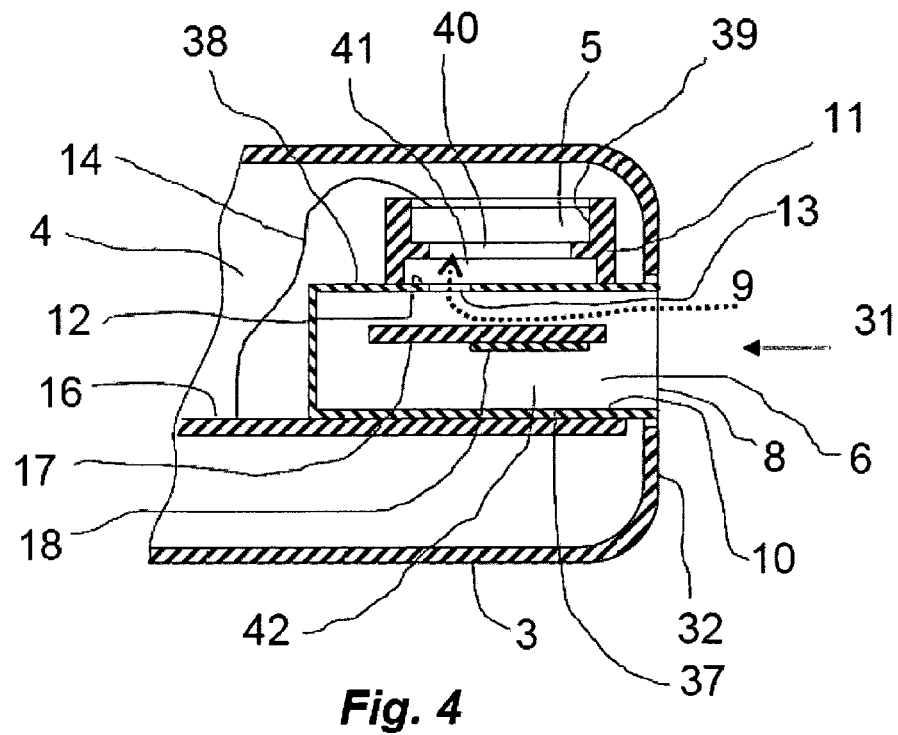
FIG. 4 is a sectional view taken along the line IV-IV in FIG. 3.

FIG. 4 discloses a sectional view along the line IV-IV in FIG. 3. The view is schematic and discloses the mutual placements of the PCB (printed circuit board) 16, the micro-USB socket 6 and the microphone boot 11. The socket 6 is mounted with a first wall 37 of the casing 6 facing the PCB 16. An opposite, parallel second wall 38 of the socket casing 6 faces the microphone boot 11. The microphone boot 11 is an enclosure made of rubber-like or other material enclosing a microphone 5. The purpose of the microphone boot 11 is to minimize the amount of sound, especially from the speaker, entering from within the headset housing. The microphone boot 11 has a microphone receiving hole 39, a connecting hole 40 and a front chamber 41. A sound opening 12 of the front chamber 41 faces an area of the second wall 38 comprising two through-going holes 13. The interior 42 of the socket 6 communicates via the holes 13 with the front chamber 41 and the surroundings via the socket opening 8. Thus, there is an audio passage 9 from the surroundings to the microphone via the socket opening 8, the socket interior 42, the through-going holes 13, the front chamber 41 and the connection hole 40. Thus, there is no need for a separate microphone opening in the housing wall 3 of the headset housing 2.

Figure 5:
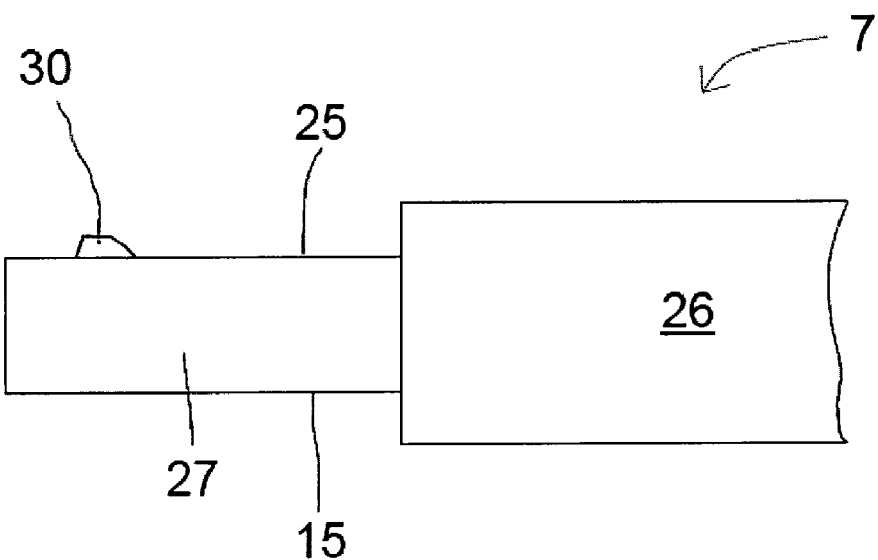
FIG. 5 is a side view of a plug for insertion into the socket of the headset according to the invention.
Figure 6:
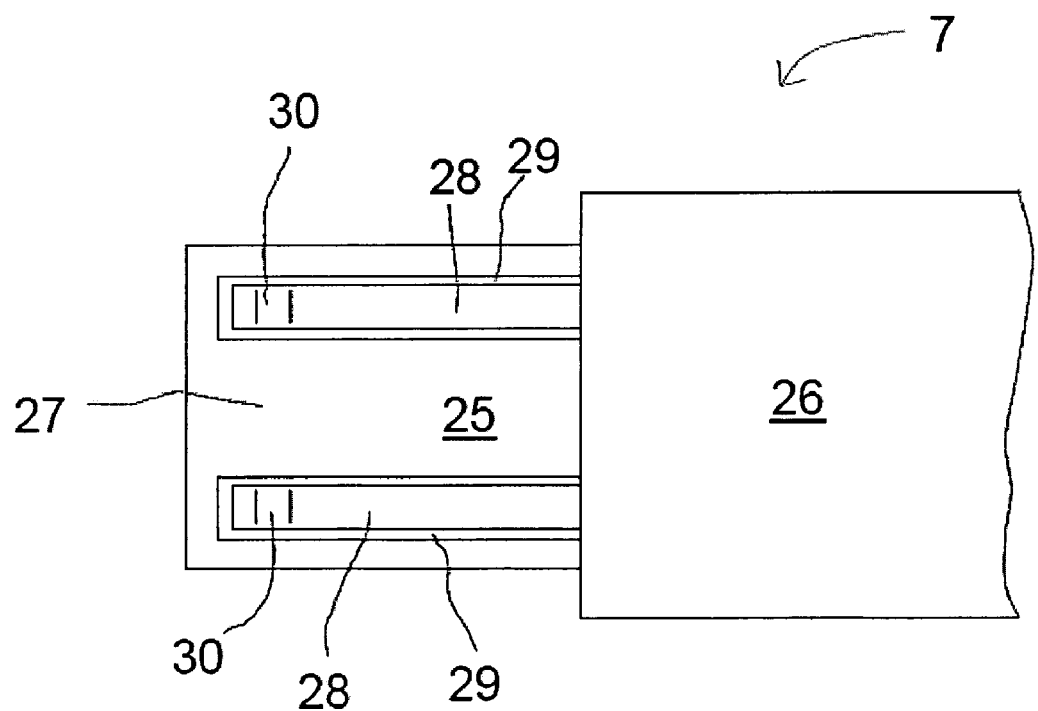
FIG. 6 is a top view of the plug shown in FIG. 5.

FIGS. 5 and 6 disclose a micro-USB plug 7 for insertion into the micro-USB socket 6. The plug 7 can be used for recharging the wireless headset 1. The plug 7 comprises a plug housing 26 and a protruding plug casing 27. Inside the plug casing 27, the plug 7 comprises a terminal base (not shown), which is adapted to be connected with the terminal base 17, when the plug 7 is inserted in the socket 6. The cross-section of the plug casing 27 corresponds to the cross-section of the socket 6. The plug casing 27 is of metal and comprises a first wall 15 and a second wall 25. The second wall 25 abuts the inside of the second wall 38, when the plug 7 is inserted in the socket 6. The second wall 25 of the plug casing 27 comprises two longitudinal slots 29 in which flexible latching members 28 extend. Each latching member 28 has a free end close to the free end of the plug casing 27. At it's free end, each latching member 28 has a latching protrusion 30 that protrudes above the outer surface of the second wall 25 of the plug casing 27. These protrusions 30 are adapted to engage the through-going holes 13 in the socket casing 10 when the plug 7 is inserted. Thus, during insertion of the plug 7 the protrusions flex inwards. When the plug 7 is fully inserted in the socket 6, the protrusions 30 flex outwards again and into the through-going holes 13. This reduces the risk of unintentional unplugging. Thus, the through-going holes 13 serve two purposes: to prevent unintentional unplugging and to provide an audio passage from the surroundings to the microphone 5.

In the shown embodiment, the plug 7 comprises the latching members 28 with protrusions 30. Alternatively, longitudinal slots 29 with latching members 28 with protrusions 30 could be provided in the socket casing 10.

In this case, the longitudinal slots 29 would provide communication between the interior 42 of the socket 6 and the sound opening 12 of the microphone boot 11. In addition, the number of latching members 28 could be only one or more than two.

The main purpose of the electrical socket 6 is to enable recharging of the battery of the wireless headset. However, the socket could also be utilized for data transfer, e.g. for upgrading the software of the headset or pairing the headset with a cell phone. In addition, the socket could be utilized for audio signals. Thus, the user could connect the headset to a computer and listen to music while the headset is recharging. The socket could also be used to stream a stereo signal to a second headset to be worn on the other ear.

Figure 7:
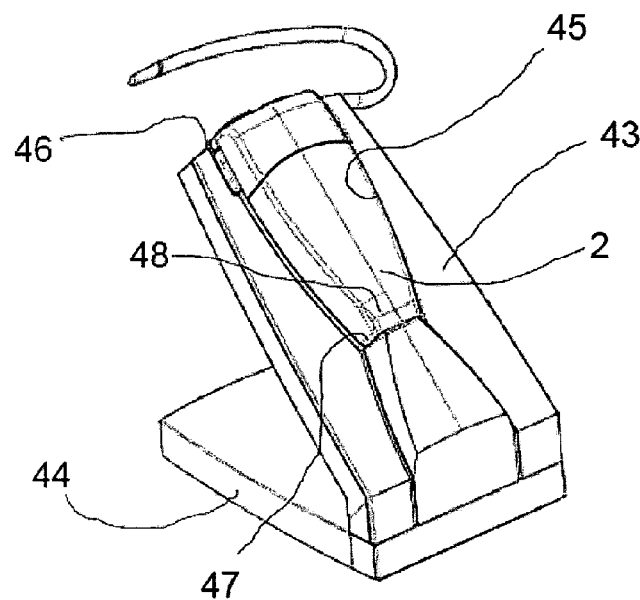
FIG. 7 is a perspective view of a headset according to an embodiment comprising a cradle.

FIG. 7 discloses an embodiment of the headset comprising a cradle 43. The cradle 43 comprises a bottom 44 by means of which it can rest on a tabletop or the like. A recess 45 extends from an upper end 46 in the direction of the bottom 44 to a recess bottom 47. An electrical plug 48 is arranged in the recess bottom 47. The recess 45 is adapted to receive the headset housing 2 so that the electrical plug 48 is inserted in the electrical socket 6, when the headset housing 2 is received by the recess 45. The cradle 43 can be used for different purposes, for example recharging, updating of the headset software, synchronizing data in the headset housing with data in a computer, personal digital assistant, cell phone or the like. Due to the placement of the socket in the microphone end of the headset body, the same end of the headset body points downwards when worn by a user and when placed in the cradle. This can be an advantage as printed information on the front of the headset body, where the bottom of e.g. letters or numbers are pointing at the microphone end, are easy to read by others during use and when the headset is placed in the cradle.

Figure 8:
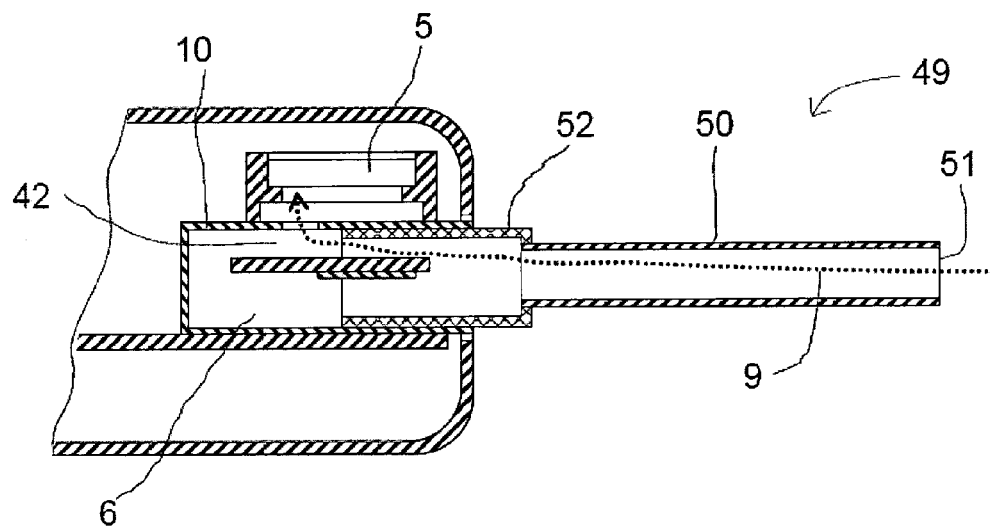
FIG. 8 is a sectional view through the headset with a sound tube.

FIG. 8 discloses an embodiment of a headset comprising a detachable sound tube device 49. The sound tube device 49 comprises a hollow sound plug 52, which is adapted to be inserted in the electrical socket 6 through the socket opening. A sound tube 50 extends form the sound plug 52 to a sound tube opening 51. As shown in FIG. 8, the audio passage 9 extend from the surroundings via the sound tube opening 51, through the sound tube 50, the sound plug 49, socket interior 42 and to the microphone as explained in connection with FIG. 4. The sound tube 50 may be deformable and extendible, so that the sound opening 51 can be arranged optimal in relation to the user's mouth. The sound tube device 49 can be provided with not shown means for acoustic impedance matching of the transmitted sound.

In the disclosed embodiment, the communication device is a headset. However, the invention could also be utilized with other communication devices such as a telephone, a PDA (personal digital assistant, a dictating apparatus or any other device comprising an electrical socket and a microphone.

A further advantage of the invention is that the communication device can be easier to protect in dirty or wet environments, as access to the housing interior via the electrical plug and the microphone can be sealed off by only one protecting plug.

The socket and plug of the disclosed embodiment is following the micro-USB standard. However, this is just an example. Completely different socket and plug types or standards could be used.

According to the disclosed embodiment, the electrical socket and the microphone are arranged close to each other. However, the microphone could also be arranged at a distance from the socket such that a sound channel or sound tube connects the microphone and the socket.

The term "audio passage" should be interpreted as a path along which sound waves can travel without significant resistance. Thus, the audio passage is not necessarily a path that air can travel through without resistance. As such, wind filters of fabric or porous material can be provided in the audio passage.

Throughout the application, the term "socket" has been used. This term could be replaced by the term "receptacle".

In addition, the term "casing" could be replaced by other terms having essentially the same meaning, such as "surrounding part", "frame", "shroud", etc.

The invention claimed is:

1. A communication device comprising:
   a housing with a housing wall encapsulating a housing interior,
   a microphone arranged in the housing interior and communicating via an audio passage with the outside of the housing,
   an electrical socket adapted to receive an electrical plug through a socket opening, which is accessible from the outside of the housing wherein the audio passage comprises the socket opening and wherein the electrical socket includes a socket casing which surrounds the socket opening and which at least partly extends in the insertion direction of the electrical plug and wherein the socket casing includes one or more through-going holes which forms a part of the audio passage and wherein the microphone is arranged in a microphone boot which abuts the socket casing and has a sound opening, which faces the socket casing, so that it communicates with the through-going holes in the socket casing and wherein the electrical plug is adapted to be removably inserted in the electrical socket, and is provided with one or more latching protrusions, which are adapted to be received in the through-going holes in the socket casing, when the electrical plug is inserted in the electrical socket.

2. A communication device according to claim 1, wherein the communication device is a wireless communication device and the electrical socket is adapted to be used for charging the communication device.

3. A communication device comprising:
   a housing with a housing wall encapsulating a housing interior,
   a microphone arranged in the housing interior and communicating via an audio passage with the outside of the housing,
   an electrical socket adapted to receive an electrical plug through a socket opening, which is accessible from the outside of the housing wherein the audio passage comprises the socket opening and wherein the electrical socket includes a socket casing which surrounds the socket opening and which at least partly extends in the insertion direction of the electrical plug and wherein the socket casing includes one or more through-going holes which forms a part of the audio passage and wherein the microphone is arranged in a microphone boot which abuts the socket casing and has a sound opening, which faces the socket casing, so that it communicates with the through-going holes in the socket casing and wherein the electrical plug is adapted to be removably inserted in the electrical socket, and is provided with one or more recesses, and where the through-going holes in the socket casing partly surrounds locking tongues, which are adapted to be received in the recesses in the electrical plug, when the electrical plug is inserted in the electrical socket.

* * * * *